(12) United States Patent
Kumar et al.

(10) Patent No.: US 11,179,874 B2
(45) Date of Patent: Nov. 23, 2021

(54) METHOD OF FORMING A CONTAINER USING A LIQUID

(71) Applicant: DISCMA AG, Zürich (CH)

(72) Inventors: Pankaj Kumar, Dexter, MI (US); Pascal Bernier, Octeville-sur-mer (FR)

(73) Assignee: Discma AG, Zürich (CH)

( * ) Notice: Subject to any disclaimer, the term of this patent is extended or adjusted under 35 U.S.C. 154(b) by 107 days.

(21) Appl. No.: 15/776,273

(22) PCT Filed: Nov. 16, 2016

(86) PCT No.: PCT/US2016/062281
§ 371 (c)(1),
(2) Date: May 15, 2018

(87) PCT Pub. No.: WO2017/087523
PCT Pub. Date: May 26, 2017

(65) Prior Publication Data
US 2020/0254675 A1    Aug. 13, 2020

(30) Foreign Application Priority Data

Nov. 16, 2015 (WO) .............. PCT/US2015/060892

(51) Int. Cl.
*B29C 49/06* (2006.01)
*B29C 49/42* (2006.01)
(Continued)

(52) U.S. Cl.
CPC .......... *B29C 49/06* (2013.01); *B29C 49/4273* (2013.01); *B29C 49/4289* (2013.01); *B29C 49/46* (2013.01); *B67C 3/02* (2013.01); *B29C 2049/4652* (2013.01); *B29C 2049/4664* (2013.01); *B29C 2049/5803* (2013.01); (Continued)

(58) Field of Classification Search
CPC . B29C 49/06; B29C 49/4273; B29C 49/4289; B29C 49/46; B29C 2049/4652; B29C 2049/4664; B29C 2049/5803; B67C 3/02; B67C 2003/2645; B67C 2003/2671; (Continued)

(56) References Cited

U.S. PATENT DOCUMENTS 7,914,726 B2 * 3/2011 Andison ................ B65B 3/022
                                                                    264/524
10,286,591 B2 * 5/2019 Tabata .................... B29C 49/12

FOREIGN PATENT DOCUMENTS

WO    2015/079627 A1    6/2015
WO    2015/114705 A1    8/2015

\* cited by examiner

*Primary Examiner* — Matthew J Daniels
*Assistant Examiner* — Shibin Liang
(74) *Attorney, Agent, or Firm* — Eric J. Sosenko; Jonathan P. O'Brien; Honigman, LLP

(57) ABSTRACT

A method of forming a container from a plastic preform while using a liquid as a blow medium. During the method, liquid is withdrawn from the container to reduce pressure within the container prior to disengaging of the injection head from the container. In one aspect the method involves the opening of a recirculation valve to reduce the pressure. The opening of the recirculation valve allowing air dispersed within the liquid to rise to the top of the container before disengaging of a forming head from the container. As a result, splashing and spillage of liquid from the neck of the container is eliminated when the forming head disengages from the container.

22 Claims, 6 Drawing Sheets

(51) Int. Cl.
    *B29C 49/46*         (2006.01)
    *B67C 3/02*          (2006.01)
    *B29C 49/58*         (2006.01)
    *B29K 23/00*         (2006.01)
    *B29K 25/00*         (2006.01)
    *B29K 67/00*         (2006.01)
    *B29K 623/00*       (2006.01)
    *B67C 3/26*          (2006.01)

(52) U.S. Cl.
    CPC .. *B29K 2023/0633* (2013.01); *B29K 2023/12* (2013.01); *B29K 2025/06* (2013.01); *B29K 2067/003* (2013.01); *B29K 2623/04* (2013.01); *B67C 2003/2645* (2013.01); *B67C 2003/2671* (2013.01)

(58) Field of Classification Search
    CPC ........ B29K 2023/0633; B29K 2023/12; B29K 2025/06; B29K 2067/003; B29K 2623/04
    See application file for complete search history.

METHOD OF FORMING A CONTAINER USING A LIQUID

BACKGROUND

1. Field of the Invention

The present invention generally relates to the forming of container from a preform, and particularly to the forming of a container from a preform using a liquid.

2. Description of Related Art

When forming plastic containers, a preform, typically formed by injection molding, is positioned within a mold while at a suitable temperature for molding. While in the mold, the preform is expanded, axially and radially, to form the container. To expand the preform, a blow medium is injected under pressure into the interior of the preform. In some processes, the blow medium is air. In more recent processes, the blow medium may be a liquid that is the end product residing within the container. This latter process is referred to herein as hydraulic blow molding.

When forming a container with air as the blow medium, the same phase, a gas, exists in both the preform and the container. However, when forming a container with liquid, both gas and liquid may be present in the formed container prior to disengagement of the forming head from the neck of the container. When the seal between the forming head and the neck of the container is broken by the disengagement of the forming head from the container, the pressure within the container is abruptly relieved. This release of pressure may cause the liquid within the container to splash out of the container. Additionally, air that was originally within the preform prior to injection of the liquid will be compressed with the liquid as the pressure within the preform increases during forming of the container. When the seal between the forming head and the neck of the container is broken, air that is in solution with the liquid comes out of solution and immediately rises to the top of the container. This immediate rise of air to the top of the container results in some of the liquid being splashed out of the container.

As a result of these two factors, at the end of the forming cycle as the forming head is being raised from engagement with the neck of the container, splash and spillage of the liquid occurs. This effect is more severe at higher production speeds because the disengagement of the forming head is faster and more abrupt. Further, when the temperature of the liquid higher than ambient, an increased amount of air will be in solution, and this will result in more violent splashing the air comes out of solution and tries to escape through the top of the container.

WO 2014/206978 discloses a method of producing a container by injecting a liquid into a preform. A stretch rod or other member is advanced into the formed container after injection of the liquid to create a peak pressure within the container. Thereafter, the force applied to the stretch rod may stop, and the liquid pressure dropped to atmospheric pressure.

WO 2013/020883 discloses a method of producing a container with a carbonated beverage. After the container is formed and the seal pin is closed, the injection head is raised slightly from engagement with the mold or top sealing surface of the preform. This allows for degassing and relieving of pressure within the molded container.

WO 2015/136368 describes a system for forming a container using liquid as the forming fluid. The system describes a method in which pressure is decreased within the container prior to disengagement of the injection nozzle from the neck of the container. The pressure is decreased by manipulation of the headspace setting member and is performed for the for the purpose of setting the headspace of the container and mitigating possible deformation of the container itself.

In view of the above, it is apparent that there exists a need to reduce the amount splashing of liquid that occurs when the forming head is disengaged from the neck of the container.

SUMMARY

In satisfying the above need, as well as overcoming the enumerated drawbacks and other limitations of the related art, the present invention provides a method of forming a container from a plastic preform while using a liquid as a blow medium, the method comprising the steps of: lowering a forming head to form a sealed engagement between the forming head and a neck of the preform; inject the liquid into the preform from the forming head, the liquid causing the preform to be formed into the container; stopping the injecting of liquid after forming of the container; disengaging the forming head from the neck of the container; and the method being characterize by, after forming of the container, withdrawing a portion of the liquid to relieve pressure within the container to about ambient prior to disengaging of the forming head from the neck of the container, whereby splashing and spillage of liquid from the neck of the container is eliminated when the forming head is disengaged from the neck of container.

In one aspect, the liquid is withdrawn from the container.

In another aspect, the liquid is withdrawn from the forming head.

In a further aspect, the liquid is withdrawn through a recirculation circuit.

In one aspect, the invention provides that the liquid is withdrawn by opening a recirculation valve in communication with the forming head and communicating the liquid within the forming head and the container with a recirculation circuit) that relieves pressure within the container to about ambient prior to disengaging of the forming head from the neck of the container, and subsequently closing the recirculation valve, whereby splashing and spillage of liquid from the neck of the container is eliminated with the forming head is disengaged from the neck of container.

Such a method is suitable for either a hot fill production cycle or a non-hot fill production cycle. By relieving the pressure within the system or container prior to disengagement of the forming head with the container, air dispersed with the liquid is evacuated from within the container, eliminating or practically eliminating splash and spillage of the liquid during disengagement of the forming head from the neck of the container.

In another aspect of the invention, the recirculation valve is closed before disengaging of the forming head from the neck of the container.

In another aspect of the invention, the recirculation valve is closed before the stopping of the injecting of liquid.

In another aspect of the invention, the recirculation valve is closed after the stopping of the injecting of liquid.

In another aspect of the invention, the injecting of liquid is achieved by opening a seal pin within the forming head and the stopping of the injecting of liquid is achieved by closing the seal pin.

In another aspect of the invention, the closing of the recirculation valve occurs at least about 100 ms after the opening of the recirculation valve.

In another aspect of the invention, the disengaging of the forming head occurs at least about 50 ms after closing of the recirculation valve.

In another aspect of the invention, air dispersed within the liquid is allowed to rise to a top of the container before disengaging of the forming head.

In another aspect of the invention, a stretch rod of the forming head is extended to elongate the preform before injecting of the liquid, and the stretch rod being at least partially retracted after closing of the recirculation valve.

In another aspect of the invention, a stretch rod of the forming head is extended to elongate the preform before injecting of the liquid, and the stretch rod being at least partially retracted after stopping the injecting of liquid and before raising of the forming head.

In another aspect of the invention, the recirculation circuit is in communication with the container for about 130 ms.

In another aspect of the invention, the container is formed by way of a hot fill production cycle.

In another aspect of the invention, the recirculation circuit is in communication with the container for about 40 ms.

In another aspect of the invention, the container is formed by way of a non-hot fill production cycle.

In another aspect of the invention, the recirculation valve is opened when pressure within the system or the container has been reduced from a peak pressure to a residual pressure.

In another aspect of the invention, the recirculation valve is closed when pressure within the system or the container has been reduced from a peak pressure to about ambient.

In another aspect of the invention, the stopping of the injecting of the liquid occurs when the system or the pressure within the container has been reduced from a peak pressure to about ambient.

Further objects, features and advantages of this invention will become readily apparent to persons skilled in the art after a review of the following description, with reference to the drawings and claims that are appended to and form a part of this specification.

DETAILED DESCRIPTION

The present invention relates to a process by which a hydraulic blow molding system 10 transforms a preform 12 into a container 14. In hydraulic blow molding, the blow molding medium is a liquid, rather than air or gas. The blow molding medium is also the end product contained within the formed container 14.

As used herein, the term "liquid" is intended to encompass non-gas, flowable mediums. The liquid may therefore have a low viscosity (like water or alcohol), a medium viscosity (like edible oil or soup) or a viscosity (like catsup or yogurt). Also the liquid may be homogeneous or nonhomogeneous and is not intended to be limited to foodstuff. Non-limiting illustrative examples of liquids that may be utilized with the present invention include cleansing products (for body, house or automotive care), medical fluids, industrial fluids, automotive fluids, and agricultural fluids. Hereafter, the blow molding medium is accordingly referred to as the "liquid blow medium."

Figure 1:
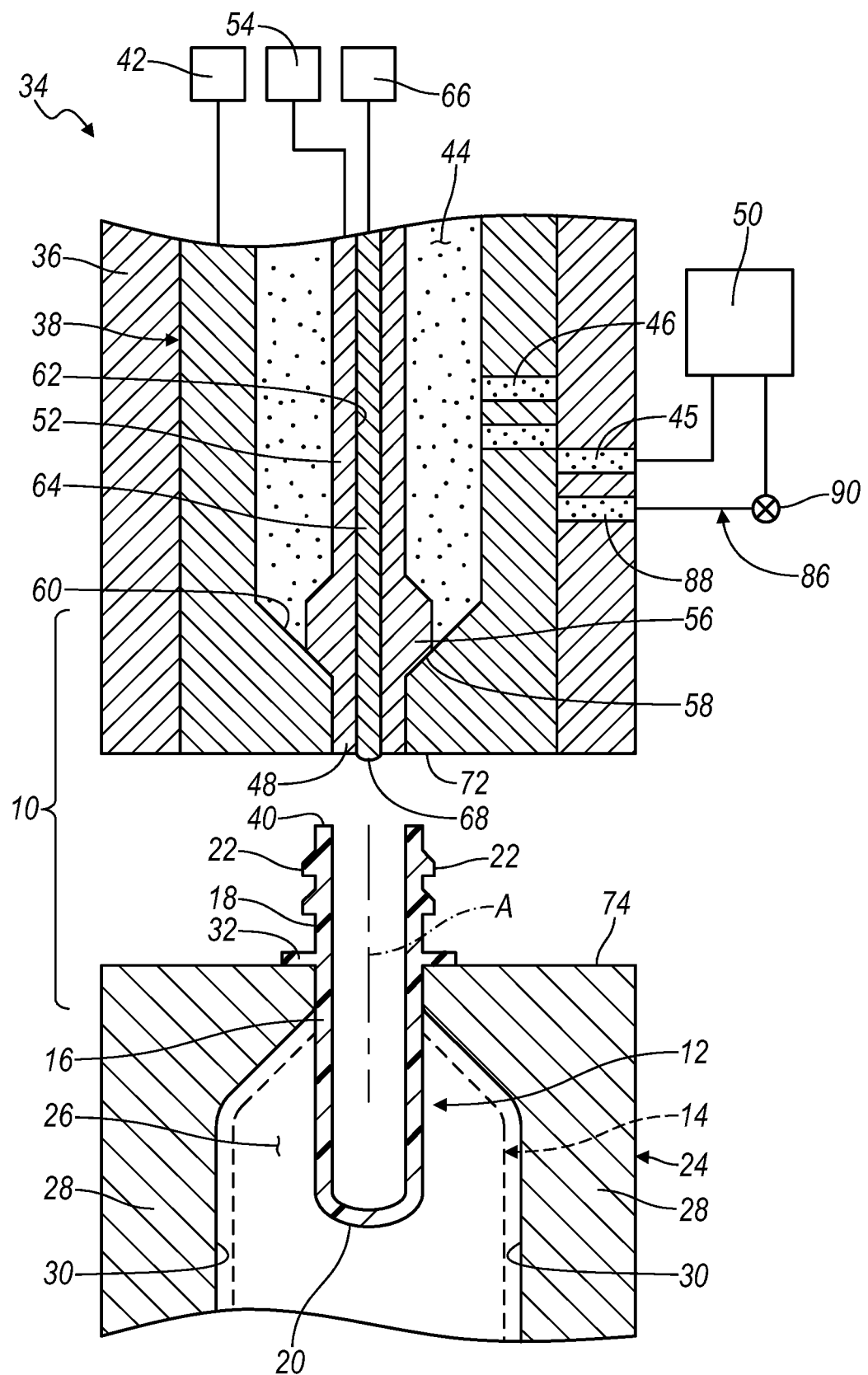
FIG. 1 is a schematic cross-sectional view of a hydraulic blow molding system embodying the principles of the present invention and illustrating the forming head retracted and disengaged from the neck of the preform and illustrating the seal pin in a closed position, as occurs at the start and end of the container forming cycle, the latter being represented by the container shown in phantom.

Referring now to the drawings, as seen in FIG. 1, the preform 12 is a hollow body 16 extending along an axis A from an open neck or finish 18 to a closed end 20. As seen in the figures, the preform 12 generally has a test tube type of shape. While the body 16 of the preform 12 is elongated and expanded during formation of the container 14, the neck 18 is initially provided in its final form and does not change. The neck 18 therefore may include threads 22 for engagement with corresponding threads of a closure (not shown). Preforms 12 are generally formed by an injection molding process and may be made of any suitable plastic material, such as polyesters including polyethylene terephthalate (PET), polyethylene naphthalate (PEN), and polyethylene imine (PEI), polyolefins including low and high density polyethylene (LDPE and HDPE, respectively) and polypropylene (PP), styrene based materials including polystyrene (PS), acrylonitrile butadiene styrene (ABS) or other polymers including polyvinyl chloride (PVC). The above listing of materials is for illustrative purposes only and is not intended to limit the scope of the invention or the materials with which the method may be practiced.

During the hydraulic blow molding process, the preform 12 is received by a mold 24 such that the body 16 of the preform 12 extends into the cavity 26 defined by the interior surfaces of at least two mold halves 28. Along with the upper surface of a base mold (not shown), the interior surfaces 30 of each mold half 28 substantially define the final shape of the container 14. The preform 12 is held by the mold 24 just below a support ring 32, which generally defines the lower end of the neck 18. The support ring 32 may rest directly upon the upper surfaces 74 of the mold halves 28 (as seen in the figures) or maybe received within a recess defined in those upper surfaces 74.

In addition to the mold 24, the hydraulic blow molding system 10 includes a forming head 34 having a housing 36 within which an injection nozzle 38 is received. The injection nozzle 38 is axially movable within a central bore of the housing 36 between a retracted position (seen in FIG. 1) and an extended position (seen in FIGS. 2-4). In the latter position, the injection nozzle engages in a top sealing surface 40 of the preform 12, as further discussed below. Movement of the injection nozzle 38 is effectuated by an actuator 42 that is coupled to the injection nozzle 38. The actuator 42 may be of any well-known variety of actuator utilized in connection with the molding of plastic containers. Such actuators are often pneumatically driven, but may be driven by other means including, without limitation, electric motors, servomotors, magnetic or other means.

The injection nozzle 38 includes a central passageway 44 through its interior which connects an inlet opening 46 to an outlet opening 48. The inlet opening 46 is further coupled to a source 50 of the liquid blow medium. The liquid blow medium is provided to the injection nozzle 38 in a pressurized state, and for this purpose, a pressurization device (not shown) may be provided in conjunction with the conduit connecting the source 50 to the inlet opening 46. The pressurization device is preferably on the well-known devices used for this purpose, and may include without limitation, pressure pumps, pistons, servomotors and other appropriate places.

Located within the central passageway 44 of the injection nozzle 38 is a seal pin 52. The seal pin 52 is axially movable within the central passageway 44, generally along the previously mentioned axis A. Similarly to movement of the injection nozzle 38, movement of the seal pin 52 is effectuated by an actuator 54 of one of the aforementioned varieties. The distal end of the seal pin 52 includes a head 56 having surfaces defining a sealing ring 58. The sealing ring 58 engages a sealing seat 60, which is defined on the injection nozzle 38 and located adjacent to the outlet opening 48. The sealing ring 58 and sealing seat 60 have complementary, conical shapes that, when engaged, seal the central passageway 44 and prevent any liquid blow medium from flowing through the outlet opening 48. While described as being conical in shape, the shape of the sealing ring 58 and sealing seat 60 maybe other than conical, so long as the engagement between the two components prevents the liquid blow medium from flowing through the outlet opening 48.

The seal pin 52 additionally includes a central bore 62 within which a headspace setting member or stretch rod 64 is located. The stretch rod 64 can be extended and retracted within the bore 62 by an actuator 66 of one of the aforementioned varieties. Extension of the stretch rod 64 advances the distal end 68 of the stretch rod 64 out of the seal pin 52, through the outlet opening 48 of the injection nozzle 38 and into the body 16 of the preform 12. When fully extended, the distal end 68 of the stretch rod 64 engages the closed end 20 of the preform 12 and axially stretches the preform 12, as further discussed below.

When forming a container 14 utilizing a liquid blow medium, a preform 12 is first positioned within the mold 24, and the mold 24 closed so as to retain the body 16 of the preform 12 within the cavity 26. At this stage of the process, the injection nozzle 38 of the forming head 34 is in a retracted position and disengaged from the preform 12, as seen in FIG. 1. Prior to introduction of the preform 12 into the mold 24, the preform 12 is thermally conditioned or preheated in an oven (not shown) to a temperature suitable for deformation and molding into the container 14. Thermal conditioning of the preform 12 and the details of ovens for this purpose are both conventional and, therefore, not discussed in greater detail. Also, since the pressurization device has previously supplied the liquid blow medium from the source 50 during a prior molding cycle, the central passageway 44 through the injection nozzle 38 is filled with the liquid blow medium at a residual or other pressure. Since the neck 18 of the preform 12 is open, pressure within the preform 12 is at ambient, which is generally indicated at 70 on the pressure curves provided in FIGS. 5 and 6.

Figure 2:
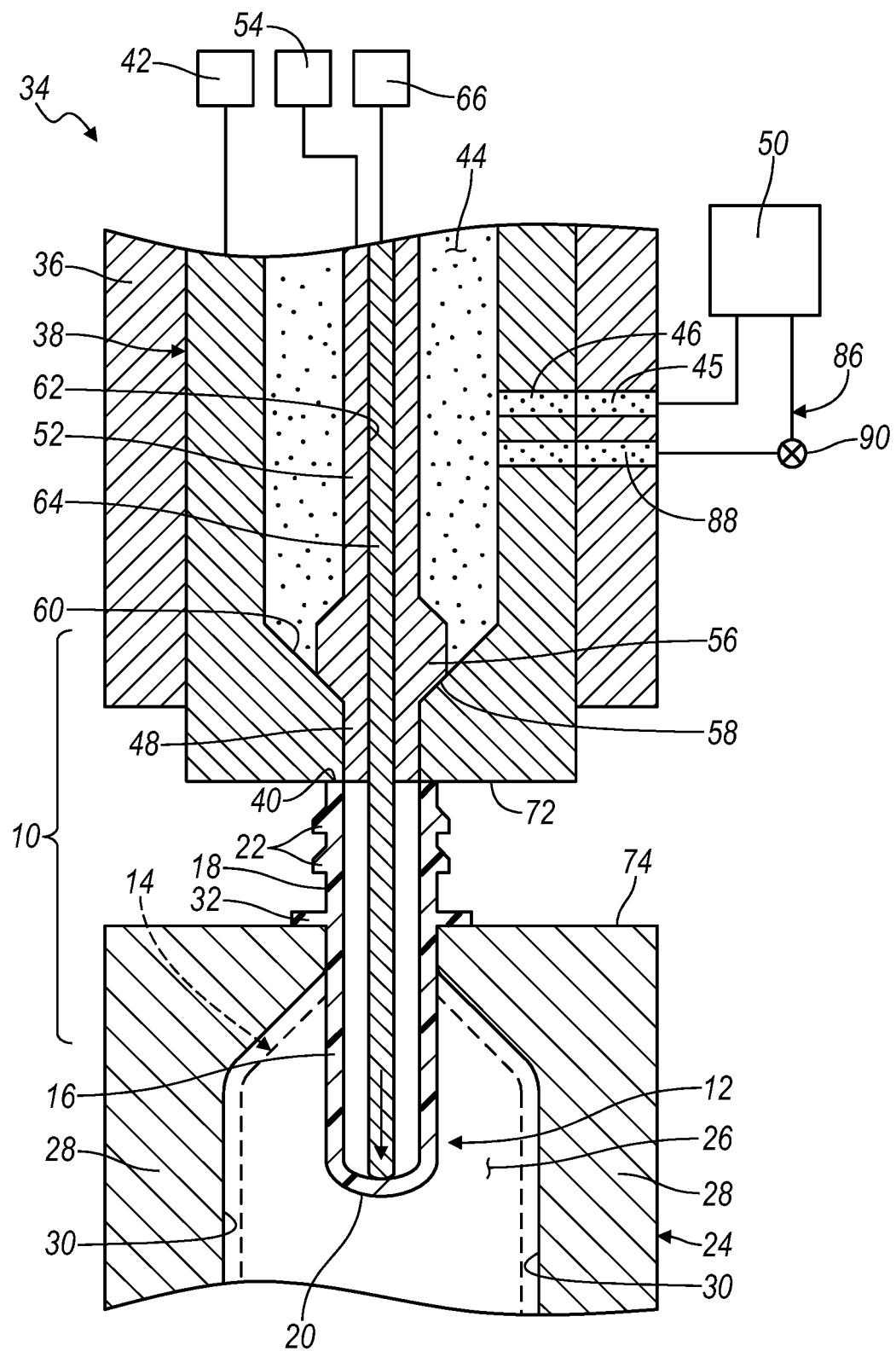
FIG. 2 is a schematic cross-sectional view of the hydraulic blow molding system seen in FIG. 1 with the forming head lowered and engaged with the neck of the preform and with the seal pin in a closed position.

With the preform 12 retained within the mold 24, the injection nozzle 38 of the forming head 34 is lowered/extended by its actuator 42 to sealing only engage the top sealing surface 40 of the preform 12. As seen in FIG. 2, the axial end face 72 of the injection nozzle 38 engages the top sealing surface 40 of the preform 12 such that the inlet opening 40 is aligned with the interior of the preform, as defined by the inner surface of the finish 18. As used herein, an axial surface or face is one that faces generally in the direction of the central axis A. In other words, the plane of the surface or face is generally perpendicular to the central axis A. While engaging the top sealing surface 40 of the finish 18 is preferred, the injection nozzle 38 could alternatively be constructed so as to sealingly engage the support ring 32 or the upper end face 74 of the mold 24.

With lowering of the injection nozzle 38, the inlet opening 46 is brought into alignment with a port 45 communicating with the source 50 of the liquid blow medium. Also while the injection nozzle 38 is being lowered, or immediately thereafter, the stretch rod 64 may also be advanced by its actuator 66. This is generally illustrated in FIG. 2 where the stretch rod 64 is shown engaging the closed end 20 of the preform 12. The stretch rod 64 is thereafter further extended so as to axially stretch the preform 12 and impinge the closed end 20 of the preform 12 against the bottom surface of the mold 24. The impingement of the closed end 20 with the bottom surface of the mold 24 is not illustrated in FIG. 2, but will be readily understood by those skilled in the art.

Once the preform 12 has been axially stretched, the seal pin 52 is opened, i.e. retracted by its actuator 54. The retraction of the seal pin 52, designated at 75 in FIG. 5, disengages the sealing ring 58 from the sealing seat 60 and opens the outlet opening 48, communicating the pressurized liquid blow medium, located within the central passageway 44, with the interior of the axially stretched preform 12. Initially, the liquid blow medium operates to maintain the stretched body 16 of the preform 12 in a spaced relationship from the stretch rod 64. Pressure within the preform 12 may initially spike and then drop (designated at 76 in FIG. 5) as a result of the initial introduction of the pressurized liquid blow medium into the preform 12.

Figure 3:
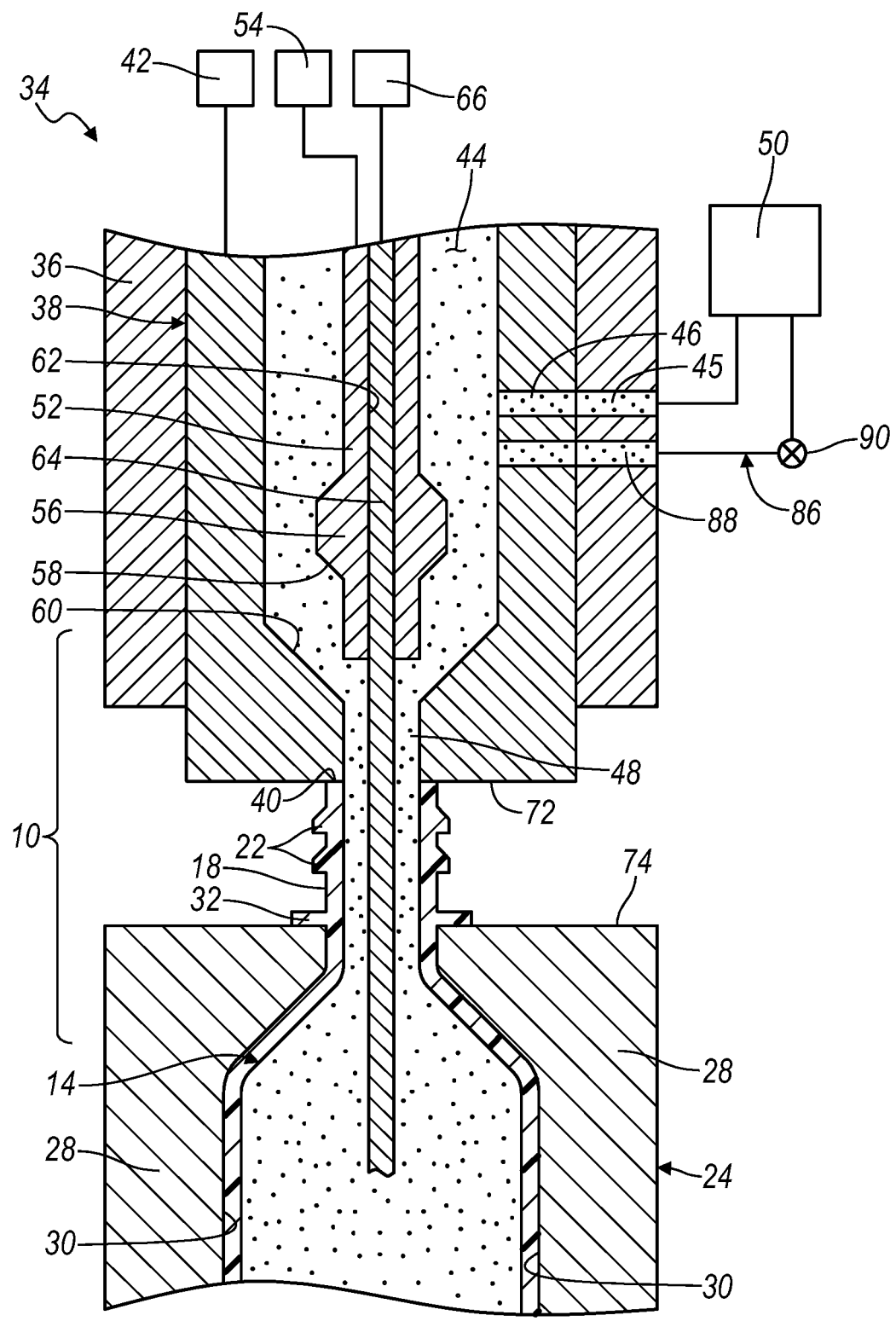
FIG. 3 is a schematic cross-sectional view of the hydraulic blow molding system seen in FIG. 2 after the seal pin has been opened and the container formed.

As the liquid blow medium continues to be injected into the preform 12, through the port 45, inlet opening 46, chamber 44 and outlet opening 48, a rapid increase in system pressure occurs, which is designated at 78. The injection of the liquid blow medium continues to significantly increase the system pressure until the system pressure reaches a peak pressure 80, which is preferably in the range of greater than 40 and up to about 80 bar (about 580 to 1160 PSI). The rapid increase in pressure (at 78) and the peak pressure 80 cause radial expansion of the body 16 of the preform 12 into substantial conformity with the interior surfaces 30 defining the cavity 26, thereby fully forming the container 14, which is illustrated in FIG. 3. At the peak pressure 80, air within the preform 12 and the subsequently formed container 14 may be compressed and completely dissolved into the liquid blow medium, thereby contributing to the peak pressure 80. Once the peak pressure 80 has been reached, the system begins to depressurize and this is designated at 82.

Figure 6:
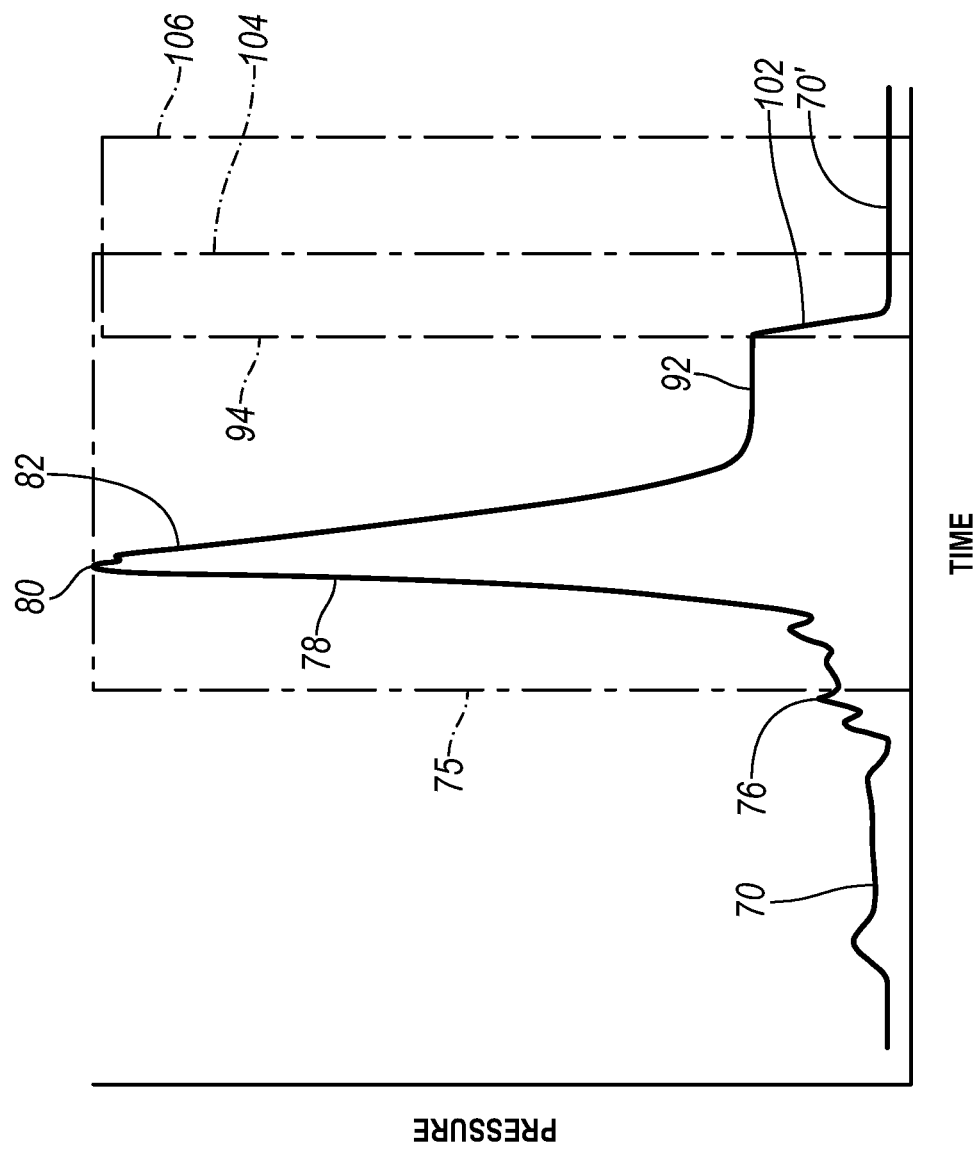
FIG. 6 is a graph illustrating a non-hot fill production cycle in accordance with the principles of the present invention.

If the liquid blow medium was injected into the preformed 12 at an elevated temperature, such as during a hot fill process (i.e. a liquid blow medium temperature of between about 85° C. and 95° C. (about 185° F. and 195° F.), the material forming the container may be at a temperature that is too hot to retain its shape if immediately removed from the mold 24. In such instances, a holding pressure (at 84) may be applied to the container 14 until the container sufficiently cools and reaches a temperature that will allow for its removal from the mold 24. The holding pressure 84 is thus a reduced pressure from peak pressure 80 and may preferably be in the range of about 10 to 40 bar (about 145 to 580 PSI). As the temperature of the liquid blow medium and the material forming the container 14 cool, the holding pressure 84 may itself slightly decrease over time. In non-hot fill applications, those with a liquid blow medium temperatures in the range of about 0° C. to 32° C. (32° F. to 90° F.), the line 82 showing the depressurization of the container would generally continue decrease and not level out at the holding pressure 84. This is seen in FIG. 6.

Figure 4:
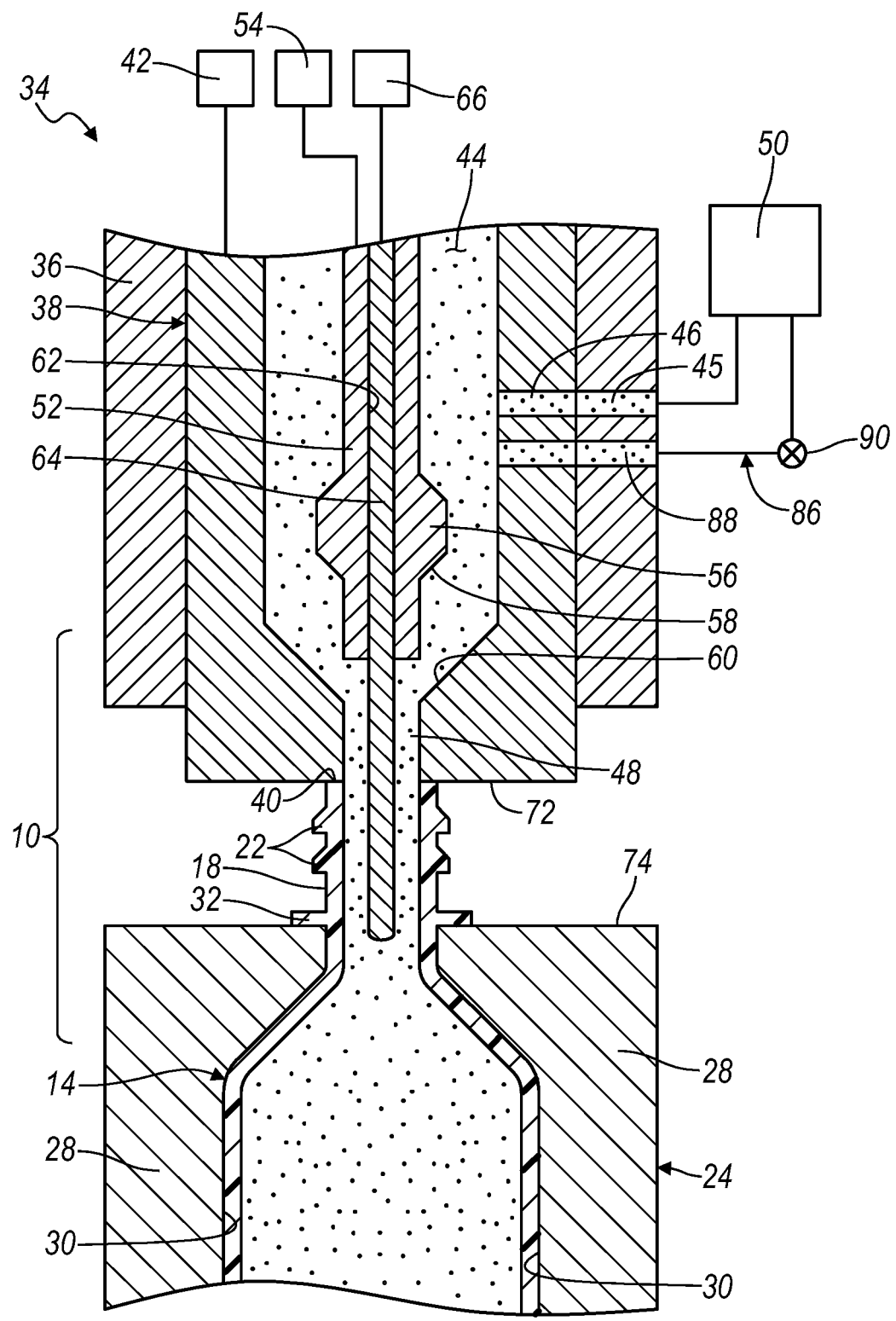
FIG. 4 is a schematic cross-sectional view of the hydraulic blow molding system seen as FIG. 4 after retraction of the stretch rod, but prior to closing of the seal pin, the latter of which is represented in phantom in FIG. 2.

While the pressure within the container 14 is being reduced at 82 or while the container is at the holding pressure 84, the stretch rod 64 may be retracted, generally to a position seen in FIG. 4. By retracting the stretch rod 64, the volume occupied by the stretch rod 64 is replaced by additional liquid blow medium that is introduced into the container 14. The stretch rod 64 is not, however, fully retracted. Rather, a length of the stretch rod 64 remains in the area of the neck 18 of the container 14. Retaining a length of the stretch rod 64 in the neck 18 of the container 14 allows that volume occupied by the stretch rod 64 to be used to set the headspace or final liquid fill level within the container 14. This occurs as a result of the level of the liquid within the container 14 dropping in proportion to the volume previously occupied by the stretch rod 64 upon complete removal of the stretch rod 64 at the end of the molding process. By retracting the stretch rod 64 to a final headspace setting position immediately before closing of the seal pin 52 and disengagement of the injection nozzle 38 from the top sealing surface 40, the headspace and fill level of the container 16 are determined.

Once the container 14 is completely formed and the seal pin 52 closed, which closes off the outlet opening 48, the pressure of the liquid blow medium (the liquid blow medium being referred to at this point as the liquid product) within the container 14 is at a residual forming pressure (at 92), which is still above ambient. Also, air entrained by the liquid blow medium during injecting of the liquid blow medium may still be retained within the container 14, along with air that is in solution with the liquid blow medium. Once the injection nozzle 38 disengages from the neck 18 of the container 14, the residual pressure is released and any air that is entrained or that is in solution is released and immediately rises to the upper surface of the liquid product. This release of pressure and the dissolution of air is abrupt and violent and, as a result, causes some of the liquid product to splash and spill out of the opening of the neck 18 of the container 14.

To mitigate splashing and spillage of the liquid product out of the opening of the neck 18 of the container 14, the forming head 34 is provided with a recirculation circuit 86. The recirculation circuit 86 communicates the central passageway 44 and the interior of the container 14 with the source of liquid blow medium 50. As alluded to above, the purpose of the recirculation circuit 86 is to relieve the residual pressure 92 within the container 14, prior to closing of the seal pin 52 and disengagement of the injection nozzle 38 from the neck 18 of the container 14. As a result, entrained air and air in solution will have been relieved and evacuated from the container 14 before closing of the seal pin 52 and disengagement of the injection nozzle 38 from the container 14.

The recirculation circuit 86, in the illustrated embodiments, includes a recirculation port 88 that is in fluid communication with the central passageway 44, through a wall of the injection nozzle 38 and the housing 36 of the forming head 34. As seen in FIG. 1-4, one portion of the recirculation port 80 is defined and extends through the injection nozzle 38 and another portion of the recirculation port 88 is defined and extends through the housing 36. As seen in FIGS. 2-4, these two portions of the recirculation port 88 become aligned with one another when the injection nozzle 38 is extended and engaged with the neck 18 of the preform/container 12/14. The recirculation circuit 86 additionally includes a recirculation valve 90 in a portion of the circuit 86 connecting the forming head 34 back to the source 50 of liquid blow medium.

Once the residual system pressure has stabilized, (at 92) which is a result of the cooling of the liquid blow medium, the cooling of the container 14 and the inherent partial depressurization of system 10, the recirculation valve 90 is opened (at 94). With the opening of the recirculation valve 90, the system pressure is immediately decreased (at 96) as the central passageway 44 and interior of the container 14 are brought into fluid communication with the source 50 of the liquid blow medium. Alternatively, the recirculation circuit 86 may communicate with a reservoir or other receptacle and not the source 50 of the liquid blow medium. However, communicating with the source 50 of the liquid blow medium has the benefit of recycling the liquid blow medium released via the recirculation circuit 86. With the opening of the recirculation valve 90, a portion of the liquid within the formed container 14 is withdrawn from the interior of the container 14, and some of the liquid in the central passageway 44 is withdrawn from the passageway 44, causing the decrease in the pressure.

Figure 5:
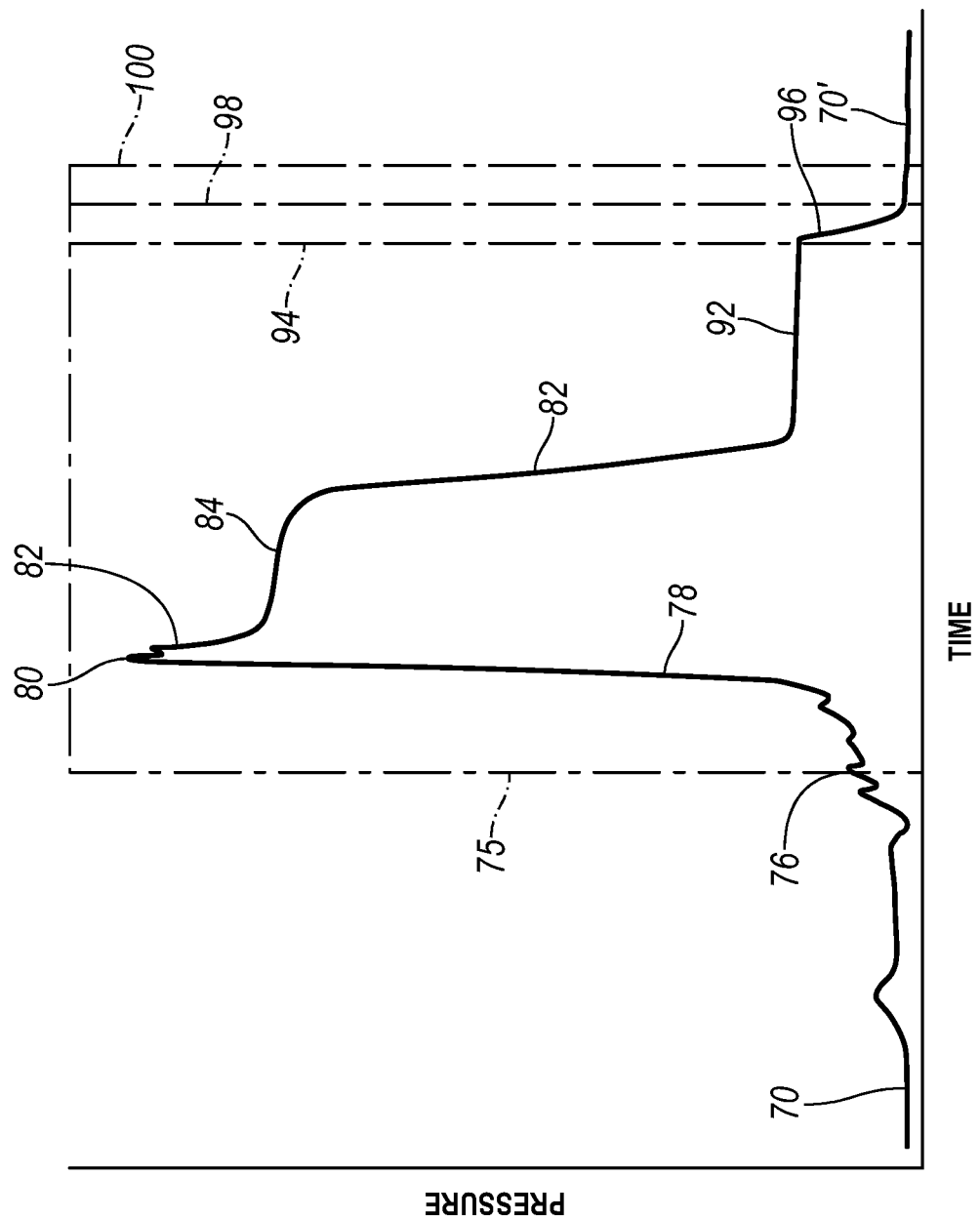
FIG. 5 is a graph illustrating a hot fill production cycle in accordance with the principles of the present invention.

One embodiment of the method of forming the container 14 is depicted in the hot-fill cycle of FIG. 5. As seen therein, after the residual forming pressure (at 92) has been established, the recirculation valve 90 is opened (at 94) and the residual pressure (at 92) is immediately relieved (at 96) to about ambient (at 70'). Upon relief of the residual pressure, the recirculation valve 90 is closed (at 98). Preferably, the recirculation valve 90 is open for at least 100 ms, and preferably about 130 ms, before being closed (at 98). The length of time that the recirculation valve 90 is open is preferably the minimum amount of time it take for all or substantially all of the air (entrained or in solution) to be relieved from the interior of the container 14. Once the air has been relieved and the recirculation valve 90 closed (at 98), the seal pin 52 is closed (at 100) by its actuator 54, taking the position generally seen in FIG. 2. The stretch rod 64 may next be moved to its final headspace setting position, which would typically be slightly retracted from the position seen in FIG. 4. Once the final headspace is set, the injection nozzle 38 may be retracted by its actuator 42 and disengaged from the neck 18 of the container 14, generally returning to the position seen in FIG. 1. From the closing of the recirculation valve 90 (at 98) until the retraction of the injection nozzle 38, only a minimal amount of delay is required to allow any remaining air to rise to the top of the container 14. That delay is preferably in the range of about 150 to 250 ms, more preferably about 230 ms and minimally about 50 to 100 ms.

In an alternative embodiment, seen in non-hot fill cycle of FIG. 6, the recirculation valve 90 is opened (at 94) immediately relieving the residual pressure (at 102) and returning the system pressure returns to about ambient (at 70'). Unlike the prior embodiment, the recirculation valve is not immediately closed. Rather, the seal pin 52 is first closed (at 104) after a time period that is sufficient to evacuate the substantial majority of air entrained or contained in solution within the container 14, which is about a minimum of 40 ms in a non-hot fill cycle. The injection nozzle 38 may then be raised by its actuator 42, after any further movement of the stretch rod 64 to a final headspace setting position. Because the seal pin 52 has already been closed (at 104), the timing of the closing of the recirculation valve 90 (at 106) is not dependent on other factors and only needs to be closed prior to the beginning of the next production cycle.

By relieving the residual pressure and evacuating the air from the interior of the container 14 in the above described manner, splashing and spillage of the liquid product can be avoided and faster cycle times can be employed in hydraulic blow molding.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A method of forming a container from a plastic preform while using a liquid as a blow medium, the method comprising the steps of:
    lowering a forming head to form a sealed engagement between the forming head and a neck of the preform;
    injecting the liquid into the preform from the forming head, the liquid causing the preform to be formed into the container;
    stopping the injecting of liquid after forming of the container;
    after forming of the container, reducing the pressure within the contain from a pressure above ambient pressure directly to ambient pressure by withdrawing a portion of the liquid from the container;
    after reducing the pressure from above ambient pressure directly to ambient pressure, disengaging of the forming head from the neck of the container, whereby splashing and spillage of liquid from the neck of the container is eliminated when the forming head is disengaged from the neck of container.

2. The method according to claim 1, wherein the liquid is withdrawn from the container.

3. The method according to claim 1, wherein the liquid is withdrawn from the forming head.

4. The method according to claim 1, wherein the liquid is withdrawn through a recirculation circuit.

5. The method according to claim 1, wherein the liquid is withdrawn by opening a recirculation valve in communication with the forming head and communicating the liquid within the forming head and the container with a recirculation circuit that relieves pressure within the container to ambient prior to disengaging of the forming head from the neck of the container, and subsequently closing the recirculation valve, whereby splashing and spillage of liquid from the neck of the container is eliminated when the forming head is disengaged from the neck of container.

6. The method according to claim 5, wherein the recirculation valve is closed before disengaging of the forming head from the neck of the container.

7. The method according to claim 5, wherein the recirculation valve is closed before the stopping of the injecting of liquid.

8. The method according to claim 5, wherein the recirculation valve is closed after the stopping of the injecting of liquid.

9. The method according to claim 5, wherein the injecting of liquid is achieved by opening a seal pin within the forming head and the stopping of the injecting of liquid is achieved by closing the seal pin.

10. The method according to claim 5, wherein the closing of the recirculation valve occurs at least about 100 ms after the opening of the recirculation valve.

11. The method according to claim 1, wherein the disengaging of the forming head occurs at least about 50 ms after closing of the recirculation valve.

12. The method according to claim 1, further characterized by allowing air dispersed within the liquid to rise to a top of the container before disengaging of the forming head.

13. The method according to claim 1, wherein a stretch rod of the forming head being extended to elongate the preform before injecting of the liquid, and the method is further characterized by the stretch rod being at least partially retracted after closing of the recirculation valve.

14. The method according to claim 1, wherein a stretch rod of the forming head being extended to elongate the preform before injecting of the liquid, and the method is further characterized by the stretch rod being at least partially retracted after stopping the injecting of liquid and before raising of the forming head.

15. The method according to claim 4, wherein the recirculation circuit being in communication with the container for about 130 ms.

16. The method according to claim 15, wherein the container is formed by way of a hot fill production cycle.

17. The method according to claim 4, wherein the recirculation circuit being in communication with the container for about 40 ms.

18. The method according to claim 17, wherein the container is formed by way of a non-hot fill production cycle.

19. The method according to claim 4, wherein the recirculation valve is opened when pressure within the system or the container has been reduced from a peak pressure to a residual pressure.

20. The method according to claim 4, wherein the recirculation valve is closed when pressure within the system or the container has been reduced from a peak pressure to ambient.

21. The method according to claim 1, wherein the stopping of the injecting of the liquid occurs when the system or the pressure within the container has been reduced from a peak pressure to ambient.

22. The method according to claim 1, wherein the during method the pressure within the container is reduced from a pressure above ambient pressure to an ambient pressure and no less than ambient pressure by the withdrawing of a portion of the liquid.

* * * * *